United States Patent Office 3,085,809
Patented Apr. 16, 1963

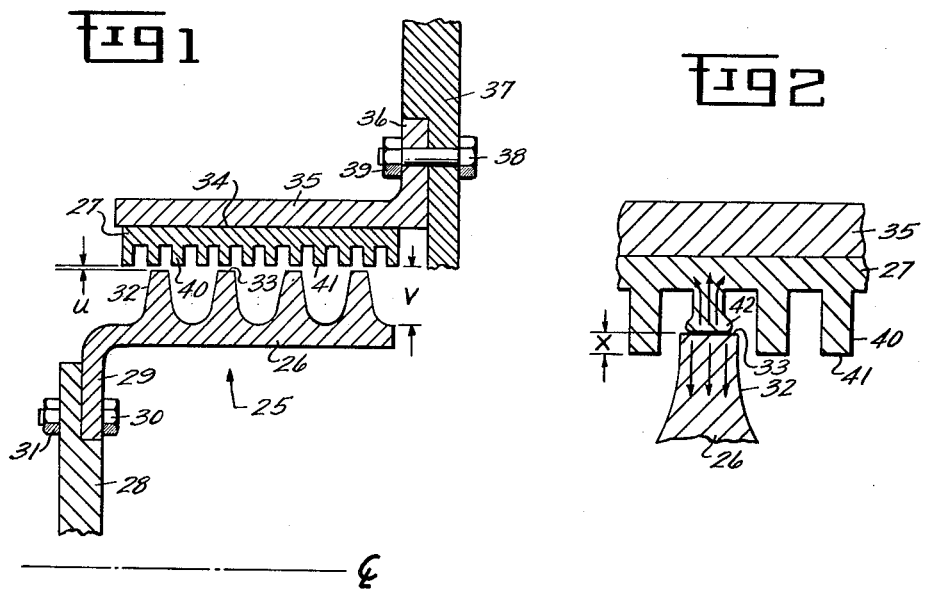
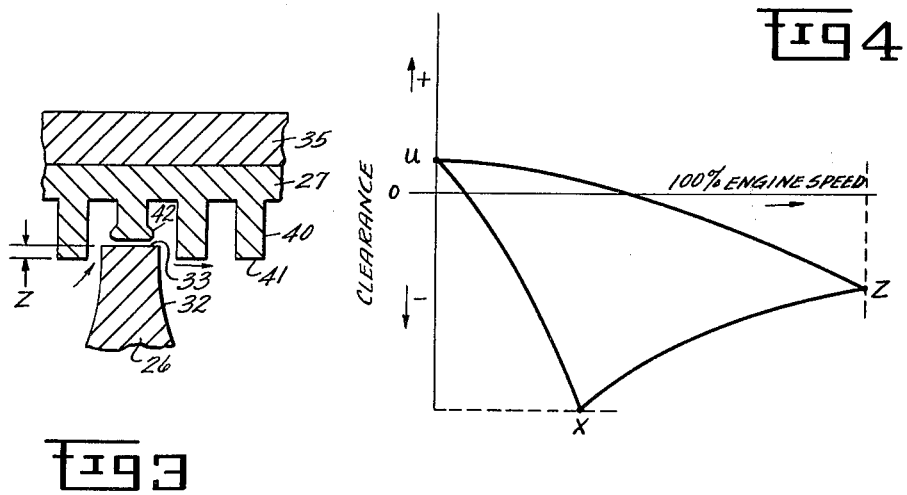

3,085,809
LABYRINTH SEAL
Alfred Leigh Cooper, West Lynn, Mass., assignor to General Electric Company, a corporation of New York
Filed Apr. 14, 1960, Ser. No. 22,369
4 Claims. (Cl. 277—56)

My invention relates to labyrinth seals, and more particularly to an improved labyrinth seal exhibiting a reduced fluid leakage characteristic. This application is a continuation-in-part of my patent application Serial No. 822,664, filed June 24, 1959 and now abandoned.

Labyrinth seals are in common use for preventing leakage of fluids between stationary and rotating portions of rotary machinery. They have particular application in machines whose stationary and rotating parts are subject to rotative expansion and thermal expansion in a direction radial to the axis of rotation, in which the use of surface-contact seals is therefore not practical.

A common type of labyrinth seal is the "staggered" design, in which a rotating runner and a stationary seat are formed with a plurality of intercalated teeth, so that a tortuous leakage flow path is established. The reversals in flow path and the orifices between the teeth impede leakage flow by throttling the fluid and thus dissipating its velocity head. However, it is not feasible to utilize a conventional staggered seal in many small machines, such as small gas turbine engines, because the seal cannot be assembled axially with its parts attached to rotor and stator elements.

One form of labyrinth seal in common use in such small machines comprises a smooth cylindrical stationary seat of silver, aluminum, or other abradable material, and a rotating annular runner having a series of axially spaced teeth with sharp apices or lands of uniform radial height.

However, many machines, for example gas turbine engines, are subject to severe transient conditions of relative thermal expansion of their parts, resulting from such occurrences as an overtemperature condition above the design point, or a rapid shutdown. During these events, differential heating and cooling rates and differential temperatures between the seal parts may result in extreme relative expansion and contraction, with extreme rubbing conditions and ultimate seizure. Seizure of seals in turbine engines has been experienced most often as a result of a sudden shutdown of fuel supply, or "throttle chop." The stationary seat of the seal, usually attached to the casing structure, cools and contracts much more rapidly than the rotating runner, which is secured to the relatively massive and well-insulated rotor structure, so that an extreme rubbing condition occurs. The condition is not generally so severe as to cause seizure, but more often does cause extreme tooth wear, with excessive clearance and leakage during subsequent use under normal operating conditions. Such seals therefore require frequent replacement in such applications.

The necessary sharpness of the lands of the teeth in this type of seal causes their extreme wear under rubbing conditions. Hot spots form at the lands of the teeth, because of the small cross-sectional area of the heat-conducting paths into the body of the runner from the lands. The lands melt into a rounded tip of reduced height. After the occurrence of such an over-temperature condition the seal clearance is consequently increased at normal operating temperatures, with a corresponding loss of sealing effectiveness.

In another form of labyrinth seal used in small machines, both a stationary seat and a rotating runner are formed with projecting teeth having sharp lands of substantially uniform radial height. The teeth are arranged either in confronting pairs, or in an axially staggered relationship such that only a portion of the teeth are arranged to rub in confronting pairs. I have found that the sharpness of the teeth, which is intended to prevent accidental seizure, causes increased leakage as wear occurs on the lands in this type of seal. Hot spots form on the lands of the rubbing pairs of teeth, so that both the seat tooth and runner tooth of each pair melt into rounded tips of reduced height. As a result, increased radial clearance between rubbing pairs of teeth develops as the seal wears in. Because the runner tooth as well as the seat tooth wears substantially, a straight flow path of increased radial clearance develops through the seal, with the result that the flow resistance and effectiveness of the seal is diminished; the throttling effect of a tortuous path is not provided by this seal design.

It is the primary object of this invention to provide an improved labyrinth seal of the type having a stationary seat and a rotating runner each formed with projecting teeth, in which a labyrinthine flow path is not straightened by wear, but exhibits reduced effective radial clearance and increased tortuousness following initial wear and during normal operation.

Further objects and advantages of my invention will become apparent from the following description.

Briefly stated, in accordance with one aspect thereof, I carry out my invention by providing a labyrinth seal comprising a stationary annular seat member and a rotating annular runner member concentrically mounted for relative rotation; by forming each of the members with axially spaced projecting teeth; by providing a first one of the members with teeth which exhibit substantially greater thermal capacity than the teeth of the second member, and which have land surfaces of substantial axial width; and by relatively spacing the teeth so that at least one of the teeth of the second member, having relatively lower thermal capacity, confronts each of the teeth of the first member for rubbing and at least one of the teeth of the second member is aligned with each space between adjacent teeth of the first member. As a result, I have found that the confronting teeth of the second member wear down more rapidly than the teeth of the first member as rubbing occurs therebetween, in inverse relation to their relative thermal capacities. Following high-temperature wear, and during normal operation at a lower temperature, the non-confronting teeth of the second member maintain their original height and cooperate with the rubbed teeth to form a labyrinthine flow path of increased tortuousness, reduced effective radial clearance, and consequently improved sealing characteristics.

Several factors influence the thermal capacity of the teeth, and these may be selected to secure desired relative wearing characteristics of the teeth. These factors include the thermal conductivity and specific heat of the materials used, and the mass and shape of the teeth. A limiting requirement of tooth shape in my improved seal is that the lands of the teeth having relatively higher thermal capacity must have substantial axial widths, in order to exhibit substantial thermal capacity in the immediate locality of the lands; otherwise, the heat concentration in the locality of the lands becomes severe and causes beading and height reduction regardless of the overall form and thermal characteristics of the teeth.

While the specification concludes with claims particularly pointing out and distinctly claiming the subject matter which I regard as my invention, it is believed that the invention may be more clearly understood from the following description of a preferred embodiment, referring to the drawings, in which:

FIG. 1 is a view in cross-section of a labyrinth seal made according to my invention, at room temperature and before operation;

FIG. 2 is a fragmentary view in section of the seal of FIG. 1, in a rubbing condition;

FIG. 3 is a view similar to FIG. 2, but showing the seal in a normal operating condition subsequent to the occurrence of a rubbing condition; and FIG. 4 is a chart graphically illustrating the clearance of the seal of FIGS. 1-3 under various operating conditions, in an illustrative gas turbine engine application.

A preferred embodiment of my improved seal, generally designated 25, is shown in FIGS. 1-3. The seal comprises an annular runner member 26 and a concentric annular seat member 27. Runner 26 is mounted for relative rotation concentric with seat 27 about the centerline shown as an axis, upon a rotor member 28 of an associated machine. The runner includes a radial flange 29, secured to member 28 by means of a row of bolts 30 and nuts 31, or in any suitable fashion.

Runner 26 is formed with a plurality of teeth 32, spaced apart in the direction of the axis of rotation. Teeth 32 must not be formed with extremely sharp lands, but are provided with cylindrical land surfaces 33 having substantial axial widths. The teeth are shown as having an individual circular form about runner 26, but may be made as attached rings, or by other means such as will occur to those skilled in the art.

Seat 27 is bonded along an outer cylindrical surface 34 to an annular support ring 35, in a conventional manner. Ring 35 is formed with an annular flange 36, which is secured to a stator member 37 of the associated machine by means of a circumferential row of bolts 38 and nuts 39, or in any suitable manner.

Seat 27 is formed with a plurality of teeth 40, spaced apart in the direction of the axis of rotation. Teeth 40 are of greater number and are spaced apart a lesser distance than teeth 32, so that only some of teeth 40 form confronting pairs with teeth 32, between which rubbing can occur; at least one of the teeth 40 is aligned with each of the spaces between adjacent teeth 32. Teeth 40 are formed with land surfaces 41, which have axial widths less than the axial widths of lands 33. In the embodiment illustrated, the runner teeth 32 have greater thermal capacity than seat teeth 40, and are preferably made of the same material to minimize cost, and accordingly are formed with greater axial land length and mass. Alternatively, however, the seat teeth may have a relatively greater thermal conductivity and capacity. In the interest of minimizing cost, I prefer to form teeth 32 and 40 of identical material; however, it will be apparent that the relative thermal capacity of the teeth may also be controlled by proper selection of differing materials. A limiting requirement is that the teeth having the higher thermal capacity may not have extremely sharp lands, but must have substantial axial widths.

Seal 25 is designed with a minimum clearance $u$ necessary for assembly of the elements so that rubbing will occur upon a slight relative expansion of runner 26 toward seat 27. There is also a clearance $v$ between lands 41 of teeth 40 and the body of runner 26.

Rubbing is not merely permissible in my improved seal, but is used to advantage to secure reduced effective radial clearance and leakage flow. This result can best be understood by reference to FIG. 2. A fragmentary portion of the seal is shown, including a single tooth 32 and several teeth 40, in an extreme rubbing condition. This event occurs, by way of illustration, when a gas turbine engine associated with seal 25 has been operated at 100% speed, and suddenly shut down by a "throttle chop." Seat 27 has cooled and shrunk rapidly relative to runner 26, and confronting pairs of teeth 32 and 40 are caused to rub substantially. The relatively wide lands 33 of the runner teeth 32 are able to conduct heat away with greater rapidity than lands 41 of the seat teeth, by conduction in directions shown by the arrows.

Relative wear of teeth 40 and 32 is controlled by selecting the dimensions of teeth 32 and 40 according to desired thermal capacity. The thermal capacity of the teeth may be defined as the number of heat units necessary to raise each tooth a certain unit of temperature, and is determined by the mass of the tooth and the specific heat of the material. Lands 41 have less axial width than lands 33 in the preferred embodiments shown, and teeth 40 are relatively low in thermal capacity; consequently, substantially all of the wear produced by the heat of rubbing friction occurs in confronting ones of teeth 40, which attain a higher temperature than teeth 32. In FIG. 2, the land of the confronting one of the teeth 40 may form a bead 42, and the height of the tooth decreases, as land 33 of tooth 32 attains an extreme negative clearance $x$.

The effect of the rub on tooth clearance under a normal 100% speed operating condition, subsequent to the rub, may be seen by referring to FIG. 3. Bead 42 has substantially reduced the height of the confronting one of teeth 40, but has not affected non-confronting ones of teeth 40. Under this operating condition, tooth 32 achieves a negative radial clearance $z$ with non-confronting teeth 40, although it has a substantial positive clearance with the confronting tooth; the effective radial clearance has the negative value $z$. Leakage flow must therefore follow a tortuous zig-zag path as shown by the arrows, with increased throttling effect and reduced leakage. It will be apparent that after the initial rub-in has occurred, my improved seal operates in a similar manner to a true staggered labyrinth seal.

The sealing effectiveness of seal 25 is graphically shown in FIG. 4. Positive or negative clearance between the runner and seat are plotted on the ordinate, and the speed of the associated turbine engine previously referred to is plotted on the abscissa. A characteristic curve for seal 25 is shown. The plotted clearance curves are taken in part from the illustrated conditions of FIGS. 1-3, and show their continuity. The initial clearance $u$ is kept at a minimum consistent with assembly, for the purpose of securing an intentional rub during initial operation and shutdown. The initial engine operation is shown by curve $u$—$z$, on which point $z$ depicts the maximum negative clearance attained under normal relative expansion at 100% engine speed. Upon a rapid shutdown, relative expansion and rubbing increases to a point $x$ of maximum negative clearance, as illustrated in FIG. 2.

Further engine cooling results in increased shrinkage of the runner relative to the seat, and the seal attains a maximum positive clearance $u$, equal to the initial clearance. However, subsequent operation of the engine causes the clearance to follow curve $u$—$z$, point $z$ depicting the negative clearance at the normal 100% engine speed operating condition illustrated in FIG. 3.

As drawn, curve $u$—$z$—$x$ assumes that substantially all rubbing wear is absorbed by confronting ones of teeth 40, and none by teeth 32. As previously explained, relative wear of the teeth can be controlled by proper selection of their materials and dimensions. If tooth 32 receives some of the wear, the final operational curve $u$—$z$ will be raised on the chart accordingly.

It will be apparent from the foregoing description that I have provided an improved labyrinth seal in which a labyrinthine flow path is not further straightened by wear, but exhibits reduced effective radial clearance and increased tortuousness following initial wear, and during normal operation. It should be understood that the relative number and spacing of the teeth of the runner and seat may be varied without departing from the operational concept of my invention. It is essential only that a first one of the members is provided with teeth having substantially greater thermal capacity than the teeth of the second member, and that only a portion of the teeth of the second member confront the teeth of the first member for rubbing, the remaining teeth of the second member being aligned with the spaces between adjacent teeth of the first member. However, a limiting consideration is that the lands of the teeth of the first member must not be extremely sharp, but must have substantial axial widths.

It will also be apparent that my improved seal can accommodate relative axial movement or misalignment of its elements without substantial loss of sealing effectiveness, since the newly confronting land surfaces of the teeth will rub to form new clearances, and will thereafter continue to function in the manner of a true staggered labyrinth seal. Also, the seal members need not be cylindrical as herein shown and described by way of illustration, but may comprise axially-spaced radial discs, having axially-extending teeth radially spaced thereon to define a radial flow path. For example, the seal shown in FIG. 1 may have members 26 and 27 mounted concentrically for relative rotation about a centerline perpendicular to that shown, but lying in the plane of the drawing. Furthermore, runner member 26 may be stationarily mounted, and seat member 27 mounted for rotation relative thereto.

It should be understood that further modifications may occur to those skilled in the art without departing from the spirit and scope of my invention, and that my invention is not limited to specific details of construction and arrangement thereof herein illustrated.

What I claim and desire to secure by Letters Patent of the United States is:

1. A labyrinth seal comprising, in combination: a seat member, a runner member mounted concentrically with said seat member for rotation relative thereto about a common axis, each of said members formed with a plurality of spaced teeth extending therefrom, the spacing between adjacent teeth of a first one of said members being substantially greater than the spacing between adjacent teeth of the second one of said members, the teeth of said first member formed with land surfaces having substantial width and the teeth of said first member having substantially greater thermal capacity than the teeth of said second member, at least one of the teeth of said second member confronting the land surface of each of the teeth of said first member, and at least one of the teeth of said second member aligned with each space between adjacent ones of the teeth of said first member, the confronting teeth of said second member being worn away by rubbing engagement with the land surfaces of the respective teeth of said first member under conditions of relative expansion of said members, whereby the tortuousness of the leakage flow path between said members is increased with increased relative expansion of said members.

2. A labyrinth seal as recited in claim 1, in which the teeth of said first member are of substantially uniform height and the teeth of said second member are of substantially uniform height.

3. A labyrinth seal comprising, in combination, an annular seat member, an annular runner member mounted concentrically with said seat member for rotation relative thereto about a common axis, each of said members formed with a plurality of axially spaced teeth extending radially therefrom, the axial spacing between adjacent teeth of a first one of said members being substantially greater than the axial spacing between adjacent teeth of the second one of said members, the teeth of said first member formed with cylindrical land surfaces having substantial axial width and the teeth of said first member having substantially greater thermal capacity than the teeth of said second member, at least one of the teeth of said second member confronting the cylindrical land surface of each of the teeth of said first member, and at least one of the teeth of said second member aligned with each axially extending space between adjacent ones of the teeth of said first member, the confronting teeth of said second member being worn away radially by rubbing engagement with the land surfaces of the respective teeth of said first member under conditions of relative radial expansion of said members, whereby the tortuousness of the leakage flow path between said members is increased with increased relative radial expansion of said members.

4. A labyrinth seal as recited in claim 3, in which the teeth of said first member are of substantially uniform radial height and the teeth of said second member are of substantially uniform radial height.

References Cited in the file of this patent

UNITED STATES PATENTS

| | | |
|---|---|---|
| 1,610,010 | Johnson | Dec. 7, 1926 |
| 1,831,242 | Hanzlik | Nov. 10, 1931 |
| 2,963,307 | Bobo | Dec. 6, 1960 |